(12) United States Patent
Muir

(10) Patent No.: US 10,494,174 B2
(45) Date of Patent: Dec. 3, 2019

(54) FOOT ACTUATED ANIMAL WASTE RECEPTACLE

(71) Applicant: Robin Muir, Buffalo, NY (US)

(72) Inventor: Robin Muir, Buffalo, NY (US)

( * ) Notice: Subject to any disclaimer, the term of this patent is extended or adjusted under 35 U.S.C. 154(b) by 503 days.

(21) Appl. No.: 15/331,161

(22) Filed: Oct. 21, 2016

(65) Prior Publication Data

US 2017/0174428 A1 Jun. 22, 2017

Related U.S. Application Data

(60) Provisional application No. 62/387,047, filed on Dec. 21, 2015.

(51) Int. Cl.
*B65F 1/16* (2006.01)
*A01K 1/01* (2006.01)
*B65F 1/06* (2006.01)

(52) U.S. Cl.
CPC ............... *B65F 1/163* (2013.01); *A01K 1/01* (2013.01); *B65F 1/06* (2013.01); *B65F 1/1646* (2013.01); *B65F 2240/136* (2013.01); *B65F 2250/1143* (2013.01)

(58) Field of Classification Search
CPC .......... B65F 1/163; B65F 1/06; B65F 1/1646; B65F 2240/136; B65F 2250/1143; A01K 1/01
USPC .................................. 220/262–264, 827–828
See application file for complete search history.

(56) References Cited

U.S. PATENT DOCUMENTS

| | | | | |
|---|---|---|---|---|
| 2,271,918 A | * | 2/1942 | Glowka | B65F 1/06 220/23.87 |
| 2,910,206 A | * | 10/1959 | Hodgson | B65F 1/163 220/23.87 |
| 5,125,526 A | * | 6/1992 | Sumanis | B65F 1/06 220/263 |
| 6,010,024 A | * | 1/2000 | Wang | B65F 1/163 220/23.87 |
| 7,665,781 B2 | | 2/2010 | Drexler | |
| 9,332,732 B2 | | 5/2016 | Stoccardo | |

(Continued)

OTHER PUBLICATIONS

U.S. Appl. No. 11/111,025, Oct. 26, 2006, Kevin Hill, Kerry Graf, US 20060236949.

*Primary Examiner* — James N Smalley
(74) *Attorney, Agent, or Firm* — Vincent G. LoTempio; Kloss, Stenger & LoTempio; David T. Stephenson

(57) ABSTRACT

A foot actuated animal waste receptacle enables sanitary and efficient disposal and storage of animal waste. A counter-weighted outer housing forms a protective casing and an ornamental design. A weight integrates into the base end of the housing to prevent tipping over. A lid hingedly connects to a housing perimeter of the outer housing, pivotally moving between open and closed positions through a foot actuated hinge mechanism. The hinge mechanism comprises a series of connected rods that pivotally articulate to move the lid. The lid is securely maintained in a closed position through a compression load stored in a compression spring, and a hook and catch that detachably couple. A rim inside the housing perimeter holds a replaceable bag inside the outer housing to directly receive animal waste. A plurality of fastening tabs are disposed around the perimeter of the rim to detachably fasten replaceable bag to the rim.

20 Claims, 6 Drawing Sheets

(56) References Cited

U.S. PATENT DOCUMENTS

| | | | |
|---|---|---|---|
| 2004/0020927 A1* | 2/2004 | Yang | A61L 9/014 220/262 |
| 2005/0106706 A1* | 5/2005 | Chomik | A61N 1/325 435/283.1 |
| 2007/0235451 A1* | 10/2007 | Lin | B65F 1/08 220/263 |
| 2009/0321449 A1* | 12/2009 | Arthurson | B65F 1/163 220/263 |

* cited by examiner

FOOT ACTUATED ANIMAL WASTE RECEPTACLE

FIELD OF THE INVENTION

This application claims the benefit of U.S. Provisional Application No. 62/387,047, filed on Dec. 21, 2015. The present invention relates generally to a foot actuated animal waste receptacle. More so, the present invention relates to a receptacle for disposing and storing of waste from an animal; whereby a counterweighted outer housing that forms a protective casing and an ornamental design; whereby a lid hingedly connects to perimeter of the outer housing, pivotally moving between open and closed positions through a foot actuated hinge mechanism; whereby the lid is securely maintained in a closed position through a compression load stored in a compression spring, and a catch lock fastener; whereby a rim holds a replaceable bag inside the outer housing for directly receiving the animal waste; and whereby a plurality of fastening tabs disposed around the perimeter of the rim detachably fasten the replaceable bag to the rim.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that disposal of animal waste, and specifically pet stools regularly protect against disease-causing bacteria, hookworms, whipworms, and other organisms that could cause serious illness. In addition, an animal, such as a dog, can spread or contract parvovirus or coronavirus through infected feces. All of these diseases are very serious and common.

Typically, a pet owner walking a pet carries a bag during the duration of the walk. While having a bag positioned to catch the animal waste is desirable, having to remove and manipulate said bag is unappealing, especially when the bag may have been dirtied due to the elements or even a diarrheic episode.

It is also known that there are myriad methods in which dog waste is collected, with solutions ranging from the simple to the more complicated methods and receptacles. Many pet owners use basic methods, such as a dedicated disposable scooper, to pick up their pet's waste. While this method is simple, it can prove difficult for people with injuries or limited range of motion. Other pet owners still find the entire process to be too much of a bother and leave their pet's waste to sit, regardless of any local regulations.

A variety of products have been developed that are designed to provide pet owners with effective and sanitary means of disposing of their pet's waste. These products include a number of pet septic disposal systems that act as repositories for waste material and provide for the addition of chemical agents, largely enzymes, to advance the decomposition of the waste. Another product involves a small shovel or scooper for picking up the waste and transferring it into a small container or disposable bag.

Both of these products can be troublesome and unpleasant to use, particularly the scooper which is required to be carried by the pet owner and used carefully in order to remove all of the waste from the ground. Since it is designed for reuse, the scooper is also usually cleaned following each use. Thus, pet owners often avoid using the scooper to avoid the task of cleaning it.

Other proposals have involved efficient storage and disposal of animal waste. The problem with these is that they require using hands around the waste, and do not always securely retain a lid in a closed position over the waste. Also, the container that actually receives the waste has to be cleaned, which is undesirable. Even though the above cited animal waste disposal methods and devices meet some of the needs of the market, a foot actuated animal waste receptacle for disposing and storing of waste from an animal having a counterweighted outer housing that forms a protective casing and an ornamental design, and a lid that hingedly connects to perimeter of the outer housing, pivotally moving between open and closed positions through a foot actuated hinge mechanism, and the lid being securely maintained in a closed position through a compression load stored in a compression spring, and a catch lock fastener, and a rim that holds a replaceable bag inside the outer housing for directly receiving the animal waste is still desired.

SUMMARY

Illustrative embodiments of the disclosure are generally directed to a foot actuated animal waste receptacle. The foot actuated animal waste receptacle provides a sanitary containing and storage system by enabling hands free manipulation to receive and dispose of animal waste. The receptacle provides an outer housing that forms a protective casing and has a foot actuated lid that moves between an open position and a closed position. A rim inside the outer housing supports a replaceable bag. The replaceable bag directly receives the animal waste and detaches from the rim for efficient disposal of the animal waste. A compression load generated by a compression spring, along with a hook and catch work to secure the lid in the closed position.

In some embodiments, the foot actuated animal waste receptacle may include a weighted outer housing. The outer housing has a continuous sidewall, a base end that is weighted down with a counterweight, and an open end. A lid hingedly connects to the open end. The lid is pivotally moved to an open position through a foot actuated hinge mechanism. The lid is securely maintained in a closed position through a compression load generated by a compression spring, and a hook and catch on the inner surface of the lid.

A replaceable bag directly receives the animal waste. A rim that is concentrically disposed to the housing perimeter detachably retains the replaceable bag. A plurality of fastening tabs disposed around the perimeter of the rim enable detachable attachment of the replaceable bag to the rim. The fastening tabs may include hook like members that penetrate a bag open end of the replaceable bag. In this manner, the replaceable bag is efficiently replaced when full of animal waste.

In one aspect, a foot actuated animal waste receptacle, comprises:

an outer housing defined by a continuous sidewall that forms a cavity, a base end having a slot, and an open end having a housing perimeter that forms an opening to the cavity;

a counterweight disposed at the base end of the outer housing, the counterweight configured to help retain the outer housing in a generally upright orientation;

a lid pivotally connected to the housing perimeter, the lid defined by an outer surface and an inner surface, the lid configured to pivot between an open position that allows access to the cavity of the outer housing, the lid further configured to pivot to a closed position that restricts access to the cavity of the outer housing;

a catch fixedly disposed at the inner surface of the lid;

a hinge mechanism operatively connected to the lid, the hinge mechanism configured to actuate the lid to the open position, the hinge mechanism having:

a foot pedal disposed to pass through the slot in the base end of the outer housing, a first rod defined by a first proximal end and a first distal end, the first proximal end configured to join the foot pedal, a fulcrum configured to pivotally support the first rod, whereby manipulation of the foot pedal pivots the first rod about the fulcrum, a second rod defined by a second proximal end and a second distal end, the second proximal end pivotally joined with the first proximal end of the first rod, the second rod disposed generally vertical to the first rod, a hook configured to pivotally couple to the second distal end of the second rod, the hook disposed to generally align with the catch at the inner surface of the lid, whereby displacement of the second rod enables detachable coupling between the hook and the catch, a third rod defined by a third proximal end and a third distal end, the third proximal end pivotally joined with the first distal end of the first rod, the third rod disposed generally vertical to the first rod, a fourth rod defined by a fourth proximal end and a fourth distal end, the fourth proximal end configured to join with the third distal end of the third rod, the fourth distal end configured to pivotally join with the inner surface of the lid, the fourth rod disposed at an angle between the third rod and the lid, whereby displacing the foot pedal towards the base end of the outer housing pivotally articulates the first rod towards the open end of the outer housing, whereby pivotal displacement of the first rod towards the open end of the outer housing displaces the third rod towards the lid, whereby displacement of the third rod towards the lid displaces the fourth rod to buttress against the inner surface of the lid, whereby displacement of the fourth rod against the inner surface of the lid moves the lid to the open position;

a compression spring configured to extend between the base end of the outer housing and the first distal end of the first rod, the compression spring further configured to operate with a compression load, whereby the compression load pulls the first rod towards the base end of the outer housing, whereby pulling the first rod towards the base end of the outer housing pulls the fourth rod away from the lid, whereby pulling the fourth rod away from the lid pulls the lid to the closed position;

a rim disposed concentrically to the housing perimeter of the outer housing;

a replaceable bag comprising a bag closed end and a bag open end, the bag open end configured to detachably attach to the rim;

a plurality of fastening tabs disposed in a spaced-apart relationship around the rim, the plurality of fastening tabs configured to detachably attach the open end of the replaceable bag to the rim.

In another aspect, the outer housing is generally cylindrical.

In another aspect, the outer housing has a fire hydrant shape.

In another aspect, the counterweight is integrated into the base end of the outer housing.

In another aspect, the lid comprises a lid hinge disposed between the lid and the housing perimeter, the lid hinge configured to enable pivotal articulation of the lid between the open position and the closed position.

In another aspect, the lid has a generally domed shape.

In another aspect, the fourth distal end of the fourth rod comprises a suction cup.

In another aspect, the rim has a generally smaller diameter than the housing perimeter.

In another aspect, the replaceable bag is fabricated from low density polyethylene.

In another aspect, the plurality of fastening tabs comprises three hooks.

In another aspect, the compression spring is oriented generally parallel to the third rod.

In another aspect, the hook pivots about a hook axis.

One objective of the present invention is to enable hands free opening and closing of an animal waste receptacle.

Another objective is to securely fasten the lid in the closed position to prevent spillage if knocked over, and to prevent animals, such as raccoons, from entering the receptacle.

Yet another objective is to provide a waste receptacle that is shaped like a fire hydrant or other ornamental structure.

Yet another objective is to counterweight down the base end of the outer housing to prevent the outer housing from tipping over.

Yet another objective is to pivotally close the lid with a compressed spring and gravity from the counterweight of the lid.

Yet another objective is to provide an inexpensive to manufacture animal waste receptacle.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
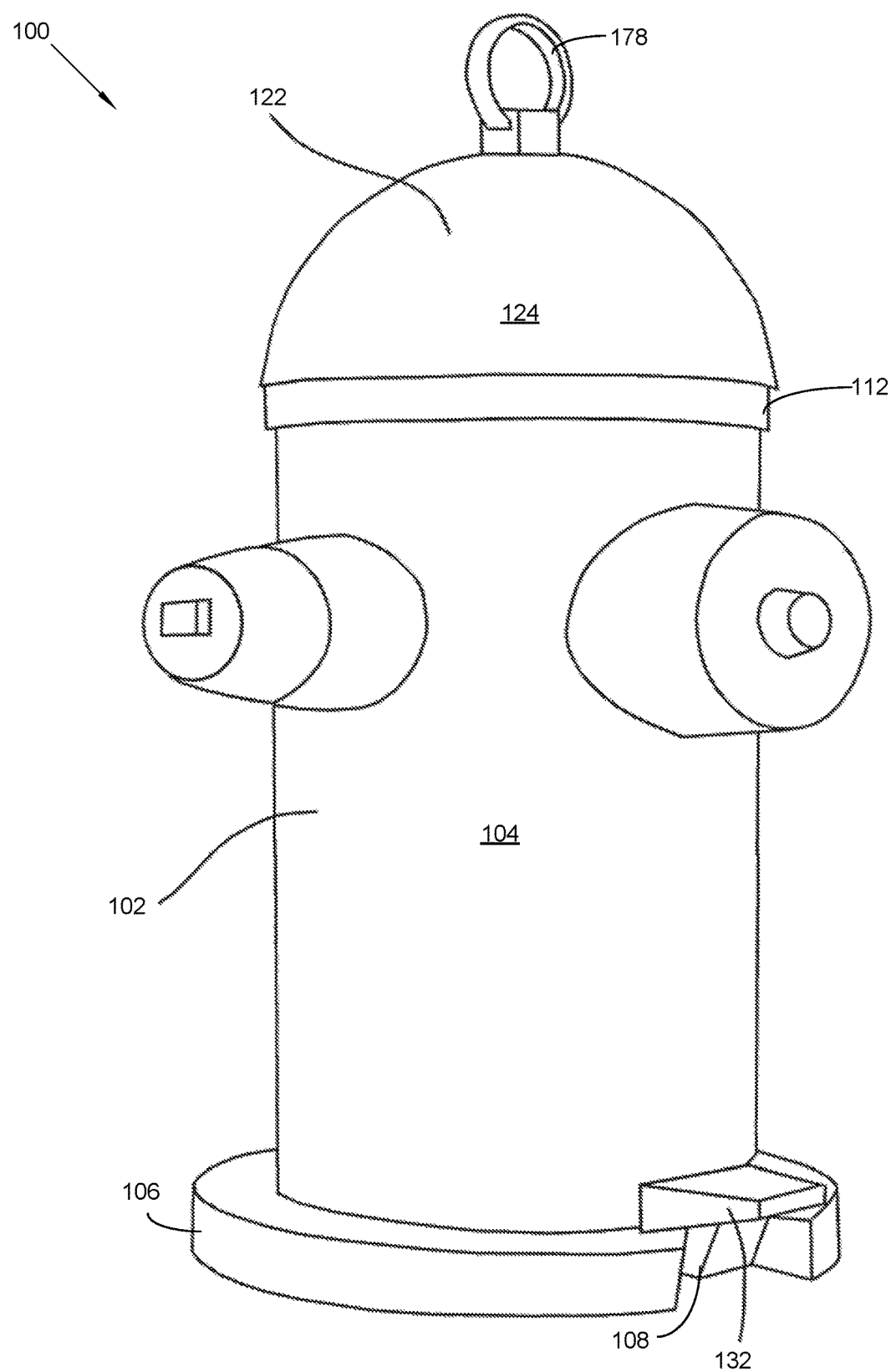
FIG. 1 illustrates a perspective side view of an exemplary foot actuated animal waste receptacle with a lid in a closed position, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A foot actuated animal waste receptacle 100 is referenced in FIGS. 1-6. Foot actuated animal waste receptacle 100, hereafter "receptacle 100" is configured to provide a sanitary containing and storage system that enables hands free manipulation to receive and dispose of animal waste. The animal waste may include, without limitation, feces, urine, vomit, and fur. The receptacle 100 may be especially useful for disposing animal waste from a pet, such as a dog. Though waste from any animal, domesticated or wild, may also be disposed in the receptacle 100.

Receptacle 100 enables sanitary and efficient disposal and storage of animal waste. A counterweighted outer housing 102 forms a protective casing and an ornamental design. A counterweight 108 integrates into the base end 106 of the housing 102 to prevent tipping over. A lid 122 hingedly connects to a housing perimeter 114 of the outer housing 102, pivotally moving between open and closed positions through a foot actuated hinge mechanism 130. Hinge mechanism 130 comprises a series of connected rods 134, 142, 152, 158 that pivotally articulate to move lid 122 between open and closed positions. Lid 122 is securely maintained in a closed position through a compression load stored in a compression spring 166, and a hook 148 and catch 118 that detachably couple. A rim 168 inside the housing perimeter 114 holds a replaceable bag 170 inside cavity 182 of outer housing 102 to directly receive animal waste. A plurality of fastening tabs 176a, 176b, 176c are disposed around the perimeter of the rim 168 to detachably fasten replaceable bag 170 to rim 168.

Receptacle 100 provides numerous advantages for efficiently and sanitarily disposing animal waste. For example, the outer housing 102 is counterweighted to maintain upright orientation, and prevent tipping over of the receptacle 100. Outer housing 102 is also configured to resemble a fire hydrant to create an ornamental effect for the receptacle 100. A hinge mechanism 130 is foot actuated to enable hands free manipulation of a lid 122 to the outer housing 102. Hinge mechanism 130 is operable with a compression spring 166, and a hook 148 and catch 118 that work to pull and retain the lid 122 in a closed position, so as to restrict unauthorized access to the cavity of outer housing 102. A replaceable bag 170 detachably affixes along a rim 168 in the cavity 182 of the outer housing 102. The replaceable aspect of the bag 170 enables efficient disposal of the animal waste. These and other advantageous of the receptacle 100 are disclosed below.

As referenced in FIG. 1, receptacle 100 comprises an outer housing 102. Outer housing 102 provides the outer, protective, visible aspect of the receptacle 100. Outer housing 102 is defined by a continuous sidewall 104 that forms a cavity 182. Sidewall 104 may have the general shape of a fire hydrant or other ornamental design. In one embodiment, continuous sidewall 104 is coated with an antibacterial agent.

Outer housing 102 is further defined by a base end 106 that engages a ground surface. The base end 106 may include a flange that sets flush against the ground surface. In one embodiment, the base end 106 is hollow, and a counterweight 108 is integrated into the base end 106. Counterweight 108 helps retain outer housing 102 in a generally upright orientation; thus preventing outer housing 102 from tipping over. Base end 106 may also include a slot 110 that is configured to enable passage and pivotal articulation of a foot pedal 132 from hinge mechanism 130, as described below.

Figure 2:
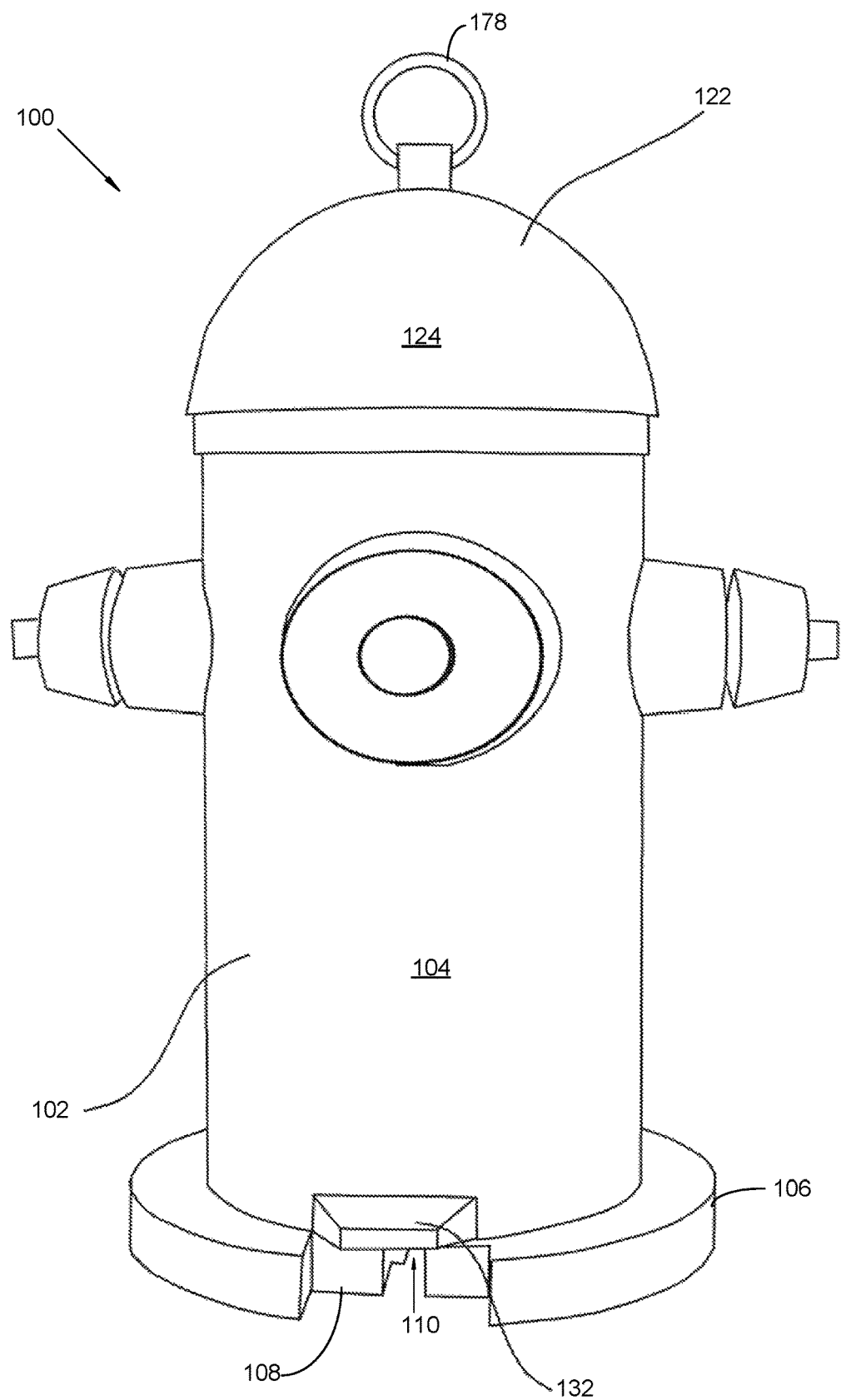
FIG. 2 illustrates a perspective front view of the foot actuated animal waste receptacle shown in FIG. 1, in accordance with an embodiment of the present invention.

As illustrated in FIG. 2, outer housing 102 is further defined by an open end 112 having a housing perimeter 114 that forms an opening 116 to the cavity 182 in outer housing 102. Suitable materials for outer housing 102 may include, without limitation, metal, a rigid polymer, silicone, wood, and combinations thereof.

Figure 3:
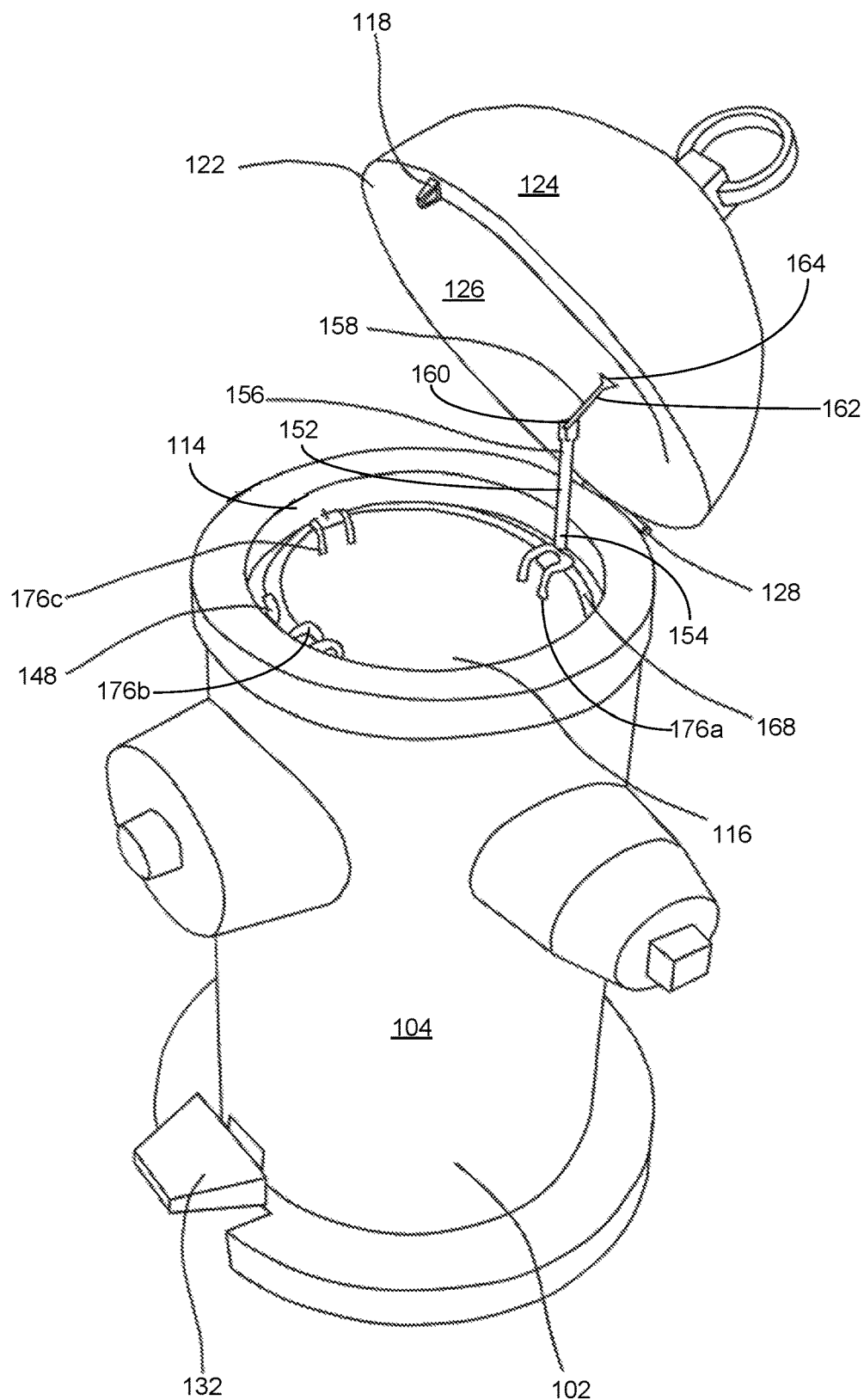
FIG. 3 illustrates a perspective view of the foot actuated animal waste receptacle shown in FIG. 1 with the lid in an open position, in accordance with an embodiment of the present invention.

Turning now to FIG. 3, a lid 122 pivotally connects to open end 112, near housing perimeter 114. Lid 122 may have a generally dome shape that matches the size and dimensions of the open end 112 of outer housing 102. Though in other embodiments, lid 122 may be shaped to be flat, concave, or convex, depending on the desired design. Lid 122 may be defined by an outer surface 124 and an inner surface 126. An antibacterial agent may coat the surfaces.

Lid 122 is configured to pivot between an open position that allows access to the cavity 182 of the outer housing 102 (FIG. 3). Lid 122 further is also configured to pivot to a closed position that restricts access to the cavity 182 of the outer housing 102 (FIG. 2). A lid hinge 128 may be disposed between lid 122 and housing perimeter 114. Lid hinge 128 is configured to enable pivotal articulation of lid 122 between the open position and the closed position.

In some embodiments, outer surface 124 of lid 122 provides a lid handle 178 that enables gripping the lid 122 and pulling to the open position. Lid handle 178 may be used in place of foot actuated hinge mechanism 130. In one embodiment, a catch 118 fixedly disposed at the inner surface 126, near periphery of lid 122. Catch 118 helps retain lid 122 in closed position. In one possible embodiment, catch 118 has a general ring shape.

Figure 4:
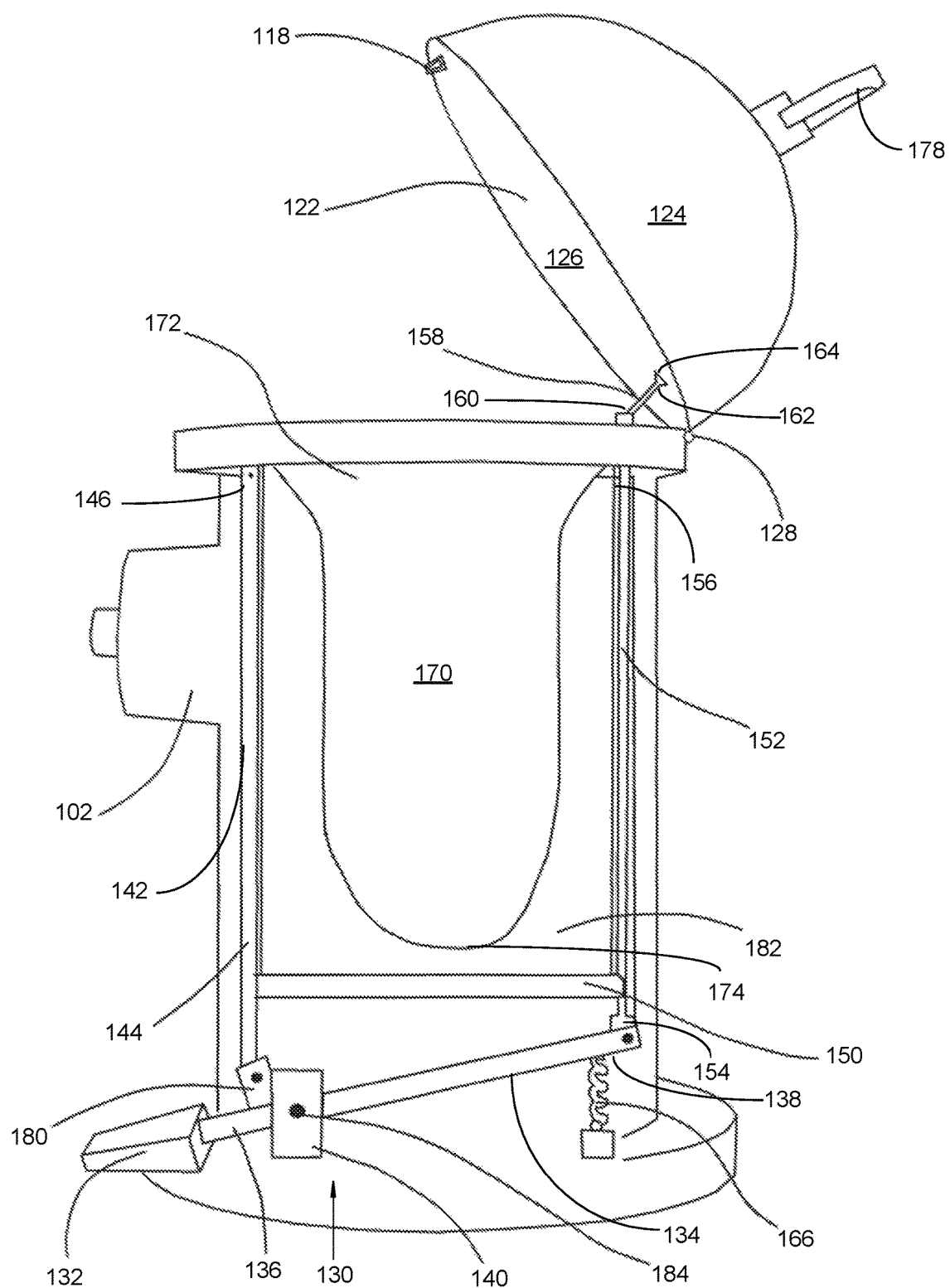
FIG. 4 illustrates a sectioned side view of the foot actuated animal waste receptacle shown in FIG. 1, illustrating a replaceable bag held in place along a rim, in accordance with an embodiment of the present invention.

Looking now at the sectioned view of FIG. 4, a hinge mechanism 130 operatively connects to lid 122 in order to enable hands free manipulation of lid 122 between the open position and the closed position. Hinge mechanism 130 is configured to articulate lid 122 to the open position by pressing down on a foot pedal 132 that passes through the slot 110 in the base end 106 of outer housing 102. Foot pedal 132 has sufficient width to provide a large target for a foot to press down.

Hinge mechanism 130 utilizes a series of rods that pivotally articulate in response to movement from foot pedal 132. In one embodiment, hinge mechanism 130 comprises a first rod 134 defined by a first proximal end 136 and a first distal end 138. First proximal end 136 is configured to fixedly join with foot pedal 132. In some embodiments, hinge mechanism 130 also utilizes a fulcrum 140 configured to pivotally support the first rod 134. Fulcrum 140 is positioned about the middle of first rod 134. In this manner, manipulation of foot pedal 132 pivots first rod 134 about fulcrum 140. Fulcrum 140 may rest on ground surface or base end 106 of outer housing 102. Fulcrum may rotate about a fulcrum axis 184, such as a pin.

Hinge mechanism 130 further comprises a second rod 142 defined by a second proximal end 144 and a second distal end 146. Second proximal end 144 is pivotally joined with first proximal end 136 of the first rod 134. In one embodiment, a pivot joint 180 connects second proximal end 144 to first proximal end 136 to create a hinged articulation therebetween. Second rod 142 is disposed generally vertical to first rod 134. In this manner, manipulating foot pedal 132 displaces second rod 142 towards the open end 112 of outer housing 102.

Figure 5:
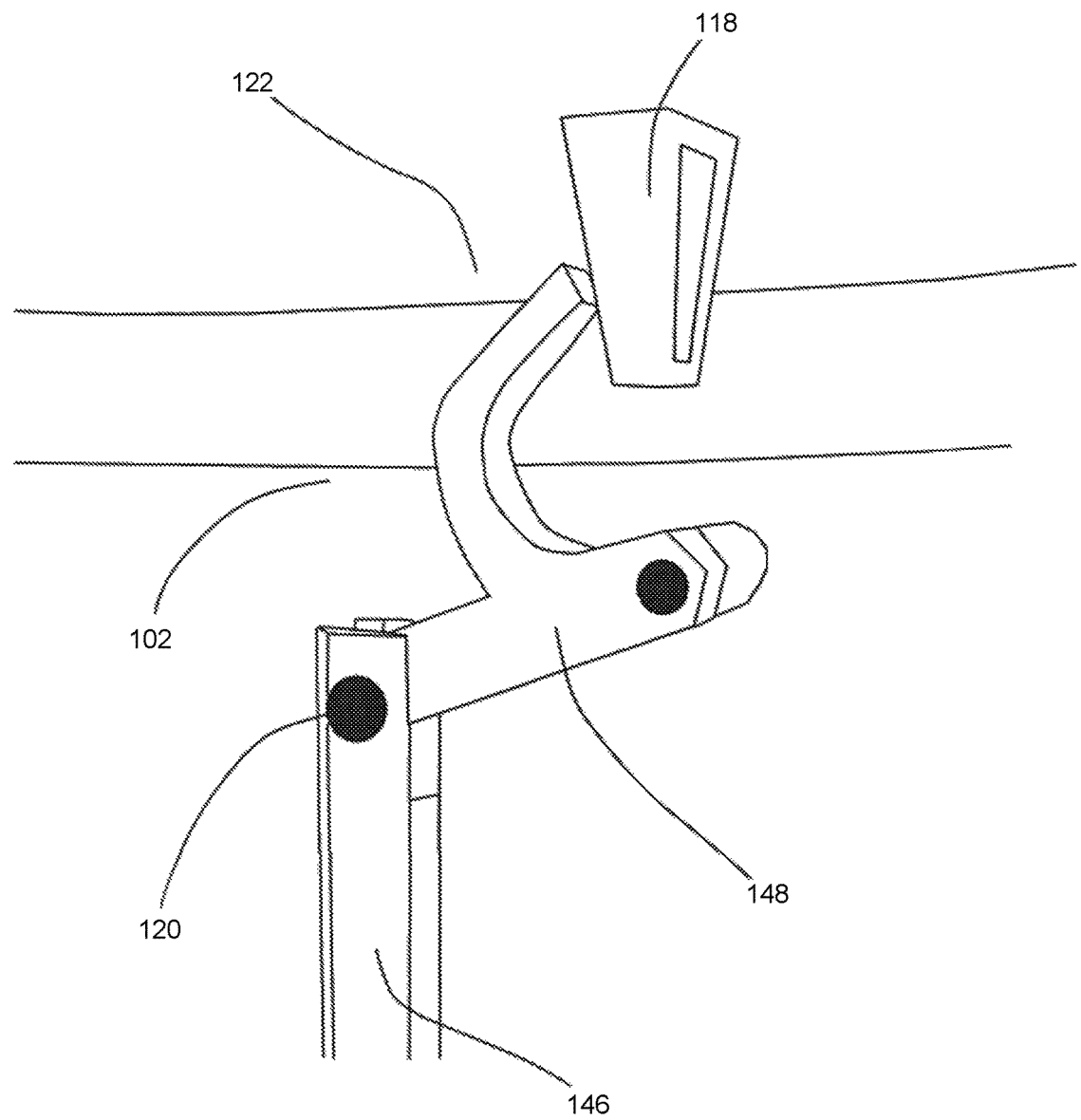
FIG. 5 illustrates a close up view of a hook and a catch engaging to fasten the lid in the closed position, in accordance with an embodiment of the present invention.

As shown in FIG. 5, a hook 148 pivotally couples to the second distal end 146 of second rod 142. Hook 148 is in general alignment with the catch 118 at the inner surface 126 of lid 122, such that hook 148 passes through an aperture in the catch 118 when engaged. In this manner, displacement of the second rod 142 towards the open end 112 of outer housing 102 enables detachable coupling between the hook 148 and the catch 118, specifically as hook 148 pivots to pass through the catch 118.

Hook 148 may rotate about a hook axis 120 passing through second distal end 146 and hook 148. This rotational articulation enables hook 148 to pivot into catch 118; thereby coupling hook 148 and catch 118. This coupling between hook 148 and catch 118 securely fastens the lid 122 to the closed position. Lifting lid 122 to open position forces hook 148 to pivot away from catch 118, and thereby enable disengagement from catch 118.

In some embodiments, hinge mechanism 130 further comprises a third rod 152 defined by a third proximal end 154 and a third distal end 156. Third proximal end 154 pivotally joins with the first distal end 138 of the first rod 134. Third rod 152 is disposed generally vertical to the first rod 134, and parallel to the second rod 142. In some embodiments, a crossbar 150 may extend horizontally between second rod 142 and third rod 152 to enhance structural integrity of hinge mechanism 130.

Hinge mechanism 130 further comprises a fourth rod 158 defined by a fourth proximal end 160 and a fourth distal end 162. Fourth proximal end 160 fixedly joins with the third distal end 156 of the third rod 152. Fourth distal end 162 pivotally joins with inner surface 126 of the lid 122. In one embodiment fourth distal end 162 comprises a suction cup 164 that attaches to inner surface 126 of lid 122. Fourth rod 158 is disposed generally at an angle between third rod 152 and lid 122.

Figure 6:
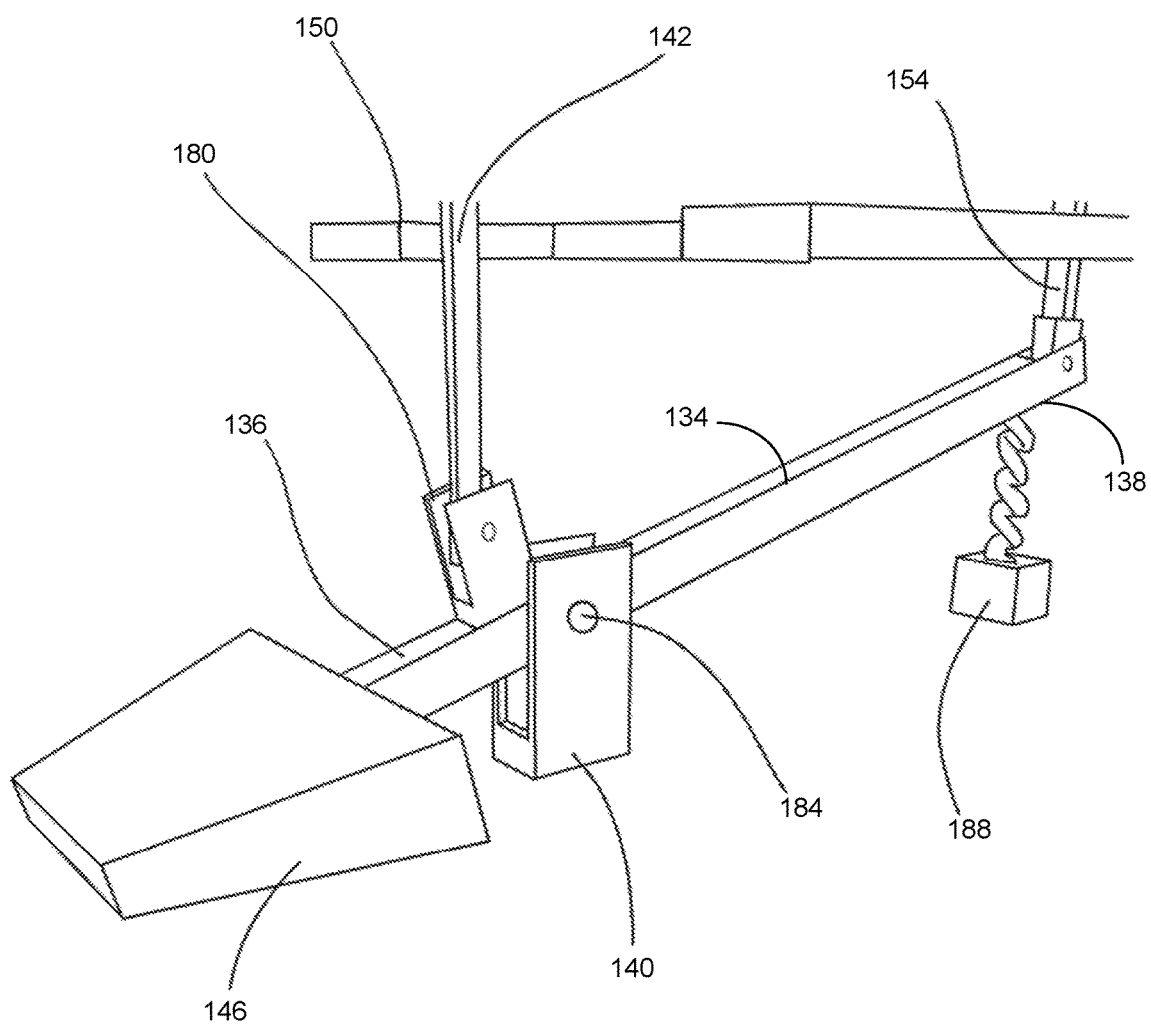
FIG. 6 illustrates a close up view of a foot pedal connected to a first rod of the hinge mechanism, in accordance with an embodiment of the present invention.

In operation of the hinge mechanism 130, illustrated in FIG. 6, displacing foot pedal 132 towards the base end 106 of outer housing 102 pivotally articulates first rod 134 towards the open end 112 of the outer housing 102. The pivotal displacement of first rod 134 towards the open end 112 of the outer housing 102 displaces the third rod 152 towards lid 122. The displacement of third rod 152 towards lid 122 displaces the fourth rod 158 to buttress against the inner surface 126 of lid 122. The displacement of fourth rod 158 against the inner surface 126 of the lid 122 works to force lid 122 to the open position.

The function of moving lid 122 to the closed position is at least partially accomplished through gravity, whereby the weight of the lid 122 causes the lid 122 to fall to the open position. In addition to the gravitational effect, lid 122 is also pulled to the closed position through a compression spring 166 that extends between base end 106 of the outer housing 102 and first distal end 138 of first rod 134. A spring anchor 188 may be used to fixedly join one end of compression spring 166 to base end 106 of outer housing 102. Compression spring 166 may also be oriented generally parallel to third rod 152.

Those skilled in the art will recognize that the compression spring 166 is configured to store a compression load. The compression load pulls the first rod 134 towards the base end 106 of the outer housing 102. Thus, both the compression load from compression spring 166, and gravitational forces work to move the lid 122 to the closed position. In operation of pulling lid 122 towards the closed position, the compression load that pulls the first rod 134 towards base end 106 of outer housing 102, also serves to pull fourth rod 158 away from lid 122. Sequentially pulling fourth rod 158 away from lid 122 pulls lid 122 to the closed position.

Turning back to FIG. 3, a rim 168 is disposed concentrically to the housing perimeter 114 of the outer housing 102. Rim 168 has generally smaller diameter than housing perimeter 114. Rim 168 may be used to retain a replaceable bag 170 in position for receiving and storing animal waste. Replaceable bag 170 is defined by a bag closed end 174 and a bag open end 172 112. Bag open end 172 detachably attach to the rim 168. In one embodiment, replaceable bag 170 is fabricated from low density polyethylene. In one embodiment, replaceable bag 170 is a typical one gallon garbage bag known in the art.

In some embodiments, a plurality of fastening tabs 176a, 176b, 176c are disposed in a spaced-apart relationship around rim 168. Fastening tabs 176a-c are configured to detachably attach the open end 112 of replaceable bag 170 to rim 168. In one embodiment, fastening tabs 176a-c comprises three hook-like members that penetrate open end 112 of replaceable bag 170. Bag open end 172 112 easily detaches from fastening tabs 176a-c to dispose of replaceable bag 170 and attach a new replaceable bag along the rim 168. In this manner, an empty replaceable bag easily attaches to fastening tabs 176a-c and positions to receive the animal waste.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A foot actuated animal waste receptacle, the receptacle comprising:
   an outer housing defined by a continuous sidewall that forms a cavity, a base end having a slot, and an open end having a housing perimeter that forms an opening to the cavity;
   a counterweight disposed at the base end of the outer housing, the counterweight configured to help retain the outer housing in a generally upright orientation;
   a lid pivotally connected to the housing perimeter, the lid defined by an outer surface and an inner surface, the lid configured to pivot between an open position that allows access to the cavity of the outer housing, the lid further configured to pivot to a closed position that restricts access to the cavity of the outer housing;
   a catch fixedly disposed at the inner surface of the lid;
   a hinge mechanism operatively connected to the lid, the hinge mechanism configured to actuate the lid to the open position, the hinge mechanism having:
   a foot pedal disposed to pass through the slot in the base end of the outer housing,
   a first rod defined by a first proximal end and a first distal end, the first proximal end configured to join the foot pedal,
   a fulcrum configured to pivotally support the first rod, whereby manipulation of the foot pedal pivots the first rod about the fulcrum,
   a second rod defined by a second proximal end and a second distal end, the second proximal end pivotally joined with the first proximal end of the first rod, the second rod disposed generally vertical to the first rod,
   a hook configured to pivotally couple to the second distal end of the second rod, the hook disposed to generally align with the catch at the inner surface of the lid,
   whereby displacement of the second rod enables detachable coupling between the hook and the catch,
   a third rod defined by a third proximal end and a third distal end, the third proximal end pivotally joined with the first distal end of the first rod, the third rod disposed generally vertical to the first rod,
   a fourth rod defined by a fourth proximal end and a fourth distal end, the fourth proximal end configured to join with the third distal end of the third rod, the fourth distal end configured to pivotally join with the inner surface of the lid, the fourth rod disposed at an angle between the third rod and the lid,
   whereby displacing the foot pedal towards the base end of the outer housing pivotally articulates the first distal end towards the open end of the outer housing,
   whereby pivotal displacement of the first rod towards the open end of the outer housing displaces the third rod towards the lid,
   whereby displacement of the third rod towards the lid displaces the fourth rod to buttress against the inner surface of the lid,
   whereby displacement of the fourth rod against the inner surface of the lid moves the lid to the open position;
   a compression spring configured to extend between the base end of the outer housing and the first distal end of the first rod, the compression spring further configured to operate with a compression load,
   whereby the compression load pulls the first rod towards the base end of the outer housing,
   whereby pulling the first rod towards the base end of the outer housing pulls the fourth rod away from the lid,
   whereby pulling the fourth rod away from the lid pulls the lid to the closed position;
   a rim disposed concentrically to the housing perimeter of the outer housing;
   a replaceable bag comprising a bag closed end and a bag open end, the bag open end configured to detachably attach to the rim; and
   a plurality of fastening tabs disposed in a spaced-apart relationship around the rim, the plurality of fastening tabs configured to detachably attach the open end of the replaceable bag to the rim.

2. The receptacle of claim 1, wherein the outer housing has a generally cylindrical shape.

3. The receptacle of claim 1, wherein the outer housing has a fire hydrant shape.

4. The receptacle of claim 1, wherein the counterweight is integrated into the base end of the outer housing.

5. The receptacle of claim 1, wherein the lid comprises a lid hinge disposed between the lid and the housing perimeter, the lid hinge configured to enable pivotal articulation of the lid between the open position and the closed position.

6. The receptacle of claim 1, wherein the lid has a generally domed shape.

7. The receptacle of claim 1, wherein the fourth distal end of the fourth rod comprises a suction cup.

8. The receptacle of claim 1, wherein the rim has a generally smaller diameter than the housing perimeter.

9. The receptacle of claim 1, wherein the replaceable bag is fabricated from low density polyethylene.

10. The receptacle of claim 1, wherein the plurality of fastening tabs comprises three hook-like members.

11. The receptacle of claim 1, wherein the compression spring is oriented generally parallel to the third rod.

12. The receptacle of claim 1, wherein the lid comprises a lid handle.

13. The receptacle of claim 1, wherein the compression spring comprises a spring anchor.

14. The receptacle of claim 1, wherein the fulcrum picots about a fulcrum axis.

15. The receptacle of claim 1, wherein the hook pivots about a hook axis.

16. The receptacle of claim 1, further comprising a pivot joint disposed between the first proximal end of the first rod and the second proximal end of the second rod.

17. A foot actuated animal waste receptacle, the receptacle comprising:
   an outer housing defined by a continuous sidewall that forms a cavity, a base end having a slot, and an open end having a housing perimeter that forms an opening to the cavity;
   a counterweight disposed at the base end of the outer housing, the counterweight configured to help retain the outer housing in a generally upright orientation;
   a lid pivotally connected to the housing perimeter through a lid hinge, the lid defined by an outer surface and an inner surface, the lid configured to pivot between an open position that allows access to the cavity of the outer housing, the lid further configured to pivot to a closed position that restricts access to the cavity of the outer housing;
   a lid handle disposed on the outer surface of the lid;
   a catch fixedly disposed at the inner surface of the lid;
   a hinge mechanism operatively connected to the lid, the hinge mechanism configured to actuate the lid to the open position, the hinge mechanism having:
   a foot pedal disposed to pass through the slot in the base end of the outer housing, a first rod defined by a first proximal end and a first distal end, the first proximal end configured to join the foot pedal, a fulcrum configured to pivotally support the first rod, whereby manipulation of the foot pedal pivots the first rod about the fulcrum, a second rod defined by a second proximal end and a second distal end, the second proximal end pivotally joined with the first proximal end of the first rod, the second rod disposed generally vertical to the first rod, a pivot joint disposed between the first proximal end of the first rod and the second proximal end of the second rod, a hook configured to pivotally couple to the second distal end of the second rod, the hook disposed to generally align with the catch at the inner surface of the lid, whereby displacement of the second rod enables detachable coupling between the hook and the catch, a third rod defined by a third proximal end and a third distal end, the third proximal end pivotally joined with the first distal end of the first rod, the third rod disposed generally vertical to the first rod, a fourth rod defined by a fourth proximal end and a fourth distal end, the fourth proximal end configured to join with the third distal end of the third rod, the fourth distal end configured to pivotally join with the inner surface of the lid, the fourth rod disposed at an angle between the third rod and the lid, whereby displacing the foot pedal towards the base end of the outer housing pivotally articulates the first distal end towards the open end of the outer housing, whereby pivotal displacement of the first rod towards the open end of the outer housing displaces the third rod towards the lid, whereby displacement of the third rod towards the lid displaces the fourth rod to buttress against the inner surface of the lid, whereby displacement of the fourth rod against the inner surface of the lid moves the lid to the open position;

a compression spring configured to extend between the base end of the outer housing and the first distal end of the first rod, the compression spring further configured to operate with a compression load, whereby the compression load pulls the first rod towards the base end of the outer housing, whereby pulling the first rod towards the base end of the outer housing pulls the fourth rod away from the lid, whereby pulling the fourth rod away from the lid pulls the lid to the closed position;

a spring anchor configured to fixedly retain one end of the compression spring to the base end of the outer housing;

a rim disposed concentrically to the housing perimeter of the outer housing;

a replaceable bag comprising a bag closed end and a bag open end, the bag open end configured to detachably attach to the rim; and a plurality of fastening tabs disposed in a spaced-apart relationship around the rim, the plurality of fastening tabs configured to detachably attach the open end of the replaceable bag to the rim.

18. The receptacle of claim 17, wherein the outer housing has a generally cylindrical shape.

19. The receptacle of claim 17, wherein the lid has a generally domed shape.

20. The receptacle of claim 17, wherein the plurality of fastening tabs comprises three hook-like members.

* * * * *